United States Patent
Lenderink et al.

(10) Patent No.: US 8,086,082 B2
(45) Date of Patent: Dec. 27, 2011

(54) METHODS FOR MOUNTING AN ELECTRO-OPTICAL COMPONENT IN ALIGNMENT WITH AN OPTICAL ELEMENT AND RELATED STRUCTURES

(75) Inventors: Egbert Lenderink, Eindhoven (NL); Ralph H. Peters, Maastricht (NL); Josef A. Schug, Wuerselen (DE); Marc A. De Samber, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 57 days.

(21) Appl. No.: 12/373,234

(22) PCT Filed: Jul. 12, 2007

(86) PCT No.: PCT/IB2007/052784
§ 371 (c)(1),
(2), (4) Date: Jan. 9, 2009

(87) PCT Pub. No.: WO2008/010160
PCT Pub. Date: Jan. 24, 2008

(65) Prior Publication Data
US 2009/0317036 A1 Dec. 24, 2009

(30) Foreign Application Priority Data
Jul. 14, 2006 (EP) .................................... 06117193

(51) Int. Cl.
*G02B 6/26* (2006.01)
(52) U.S. Cl. ........................................................ 385/52
(58) Field of Classification Search ........................ None
See application file for complete search history.

(56) References Cited

U.S. PATENT DOCUMENTS

| | | |
|---|---|---|
| 2004/0042729 A1 | 3/2004 | Zhou et al. |
| 2005/0156187 A1 | 7/2005 | Isokawa et al. |
| 2005/0167679 A1 | 8/2005 | Ishii et al. |
| 2005/0258445 A1 | 11/2005 | Wu |

FOREIGN PATENT DOCUMENTS

| | | |
|---|---|---|
| EP | 0720241 A2 | 7/1996 |
| EP | 1528602 A1 | 5/2005 |
| GB | 2276492 A | 9/1994 |
| JP | 10170769 A | 6/1998 |
| JP | 2004004195 A | 1/2004 |

OTHER PUBLICATIONS

S.Lezekiel; "Microwave Photonic Multichip Modules", Electronics and Comm. Eng. Journal, Institution of Electrical Eng, London, GB, vol. 9, No. 4, Aug. 1997, pp. 156-164, XP000733007.
C.A. Jones et al; "Hybrid Integration Onto Silicon Motherboards With Planar Silica Waveguides", IEE Proceedings: Optoelectronics, Inst. of Electrical Eng., Stevenage, GB, vol. 143, No. 5, Oct. 1996, pp. 316-321, XP000680747.
K.P. Jackson; "A Compact Multichannel Transceiver Module Using Planar-Processed Optical Waveguides and Flip-Chip Optoelectronic Components", Proc. of the Electronic Components and Tech. Conf. San Diego, May 18, 1992, vol. Conf. 42, pp. 93-97, XP000473970.
Michel De La Bachelerie et al; "MOEMS Devices and Their Applications to Optical Telecomunication System", Annales Des Telecommunications—Annals of Telecomunications, Get Lavoisier, Paris, FR, vol. 58, No. 9/10, Sep. 2003, pp. 1401-1423, XP001186065.

*Primary Examiner* — Sung Pak

(57) ABSTRACT

Mounting an electro-optical component (1) on a carrier substrate (2) in an accurate position with respect to an optical element (6), the carrier substrate and the electro-optical component each being provided with at least one solder pad (3, 4). The solder pads are arranged such that, when said electro-optical component is soldered onto the pads, a force is generated that acts on the electro-optical component in a direction (x) towards the optical element, and the structure is designed to allow said electro-optical component to move laterally during soldering, such that it is brought into abutment with said optical element, thereby ensuring an accurate relative positioning between the electro-optical component and the optical element.

11 Claims, 2 Drawing Sheets

METHODS FOR MOUNTING AN ELECTRO-OPTICAL COMPONENT IN ALIGNMENT WITH AN OPTICAL ELEMENT AND RELATED STRUCTURES

This application is a national stage application under 35 U.S.C. §371 of International Application No. PCT/IB2007/052784 filed on Jul. 12, 2007, and published in the English language on Jan. 24, 2008, as International Publication No. WO/2008/010160, which claims priority to European Application No. 06117193.0, filed on Jul. 14, 2006, incorporated herein by reference.

TECHNICAL FIELD OF THE INVENTION

The present invention relates to a method for mounting an electro-optical component in an accurate position with respect to an optical element, comprising soldering the electro-optical component onto a carrier substrate being fixedly arranged in relation to the optical element, using soldering pads provided on the electro-optical component and the carrier substrate respectively.

BACKGROUND ART

In applications involving electro-optical components such as LEDs, it is sometimes important to ensure accurate alignment of these components in relation to an optical element.

In particular, this is true for applications that are "etendue critical", i.e. where maximum efficiency is needed with minimum aperture size. Examples of these applications are camera (video or photo) flash, spotlamp, and optical fiber systems for medical applications such as endoscopy. Another example is when a LED is used as a light source in a collimator, e.g. for use in an automotive headlamp.

As it is important that the electro-optical component and the optical element are precisely aligned in relation to each other, very high accuracy is required in the mounting process. Though satisfactory alignment is feasible, it comes at a price, e.g. in terms of limitations regarding mounting process order.

One attempt to improve alignment of the electro-optical component with the optical element, has been to make the latter an integral part of a module onto which the substrate is mounted. However, this does not eliminate the problem of accurate alignment. Typically, the electro-optical component is soldered onto the carrier substrate, whereas the substrate is mounted onto the module in such a way that the electro-optical component is very accurately placed with respect to the optical component. In this process, each step has its associated tolerances, which add up to the final positioning uncertainty. In many cases, this uncertainty is too large. For example, in the case with a LED used as a source in a collimator, from an optical point of view a positioning uncertainty of at most 0.05 mm is desirable. Such accuracy is not feasible for the chain of tolerances described above.

SUMMARY OF THE INVENTION

It is an object of the invention to provide a method of mounting an electro-optical component in an accurate position with respect to an optical element, within required tolerances.

According to a first aspect, this object is achieved by a method for mounting an electro-optical component in alignment with an optical element, comprising soldering the electro-optical component onto a carrier substrate being fixedly arranged in relation to the optical element, using soldering pads provided on the electro-optical component and the carrier substrate respectively. The solder pads are positioned such that, when the electro-optical component is soldered onto the pads, a force is generated that acts on the electro-optical component in a direction towards the optical element, and allowing the electro-optical component to move in said direction, such that it is brought into abutment with the optical element.

According to a second aspect, this object is provided by a mounting structure comprising an electro-optical component to be mounted in alignment with an optical element, the electro-optical component being provided with at least one solder pad, and a carrier substrate, fixedly arranged with respect to the optical element, the carrier substrate being provided with at least one solder pad. The solder pads are arranged such that, when the electro-optical component is soldered onto the pads, a force is generated that acts on the electro-optical component in a direction towards the optical element, and the mounting structure is designed to allow the electro-optical component to move in said direction during soldering, such that it is brought into abutment with the optical element. As an example, the mounting structure is designed to allow the electro-optical component to move laterally during soldering, such that it is brought into abutment with the optical element.

The present invention is based on the fact that during the soldering process of an electrical component, in particular a surface mount device (SMD) component, the component "flows" in the molten solder towards a certain well-defined end position governed by the surface tensions laws. According to the invention, the solder pads on the substrate are positioned such that the electro-optical component is brought into abutment with the optical element, thereby ensuring an accurate relative positioning between the electro-optical component and the optical element.

Such self-alignment effects are described e.g. in GB2276492, which discloses a mounting structure of optical elements, where an optical component is aligned with positioning elements on a substrate. The positioning elements ensure an accurate alignment in the vertical direction, while the position of the solder pads themselves ensure an accurate alignment in the horizontal direction.

The self-alignment effect is further exploited in the present invention, where the electro-optical component is self-aligned in the horizontal direction, not against a separate positioning element, but with the optical element itself. Such self-alignment between functionally related objects, i.e. between the optical element and the electro-optical component, is not disclosed by GB2276492.

According to a preferred embodiment of the invention, the electro-optical component and/or the optical element has a geometric form adapted to align the electro-optical component when brought into abutment with the optical element.

Thus, the electro-optical component and/or the optical element is designed to achieve requested positioning accuracy of the electro-optical component with respect to the optical element during the self-alignment.

The solder pads arranged on the carrier substrate can be laterally displaced in relation to corresponding pads on the electro-optical component. This will create a force in the direction of displacement during soldering.

Preferably, the solder pads on the carrier substrate have such an extension that they completely support corresponding pads on the electro-optical component during the entire self-alignment process. In other words, regardless of when the self-alignment is interrupted by the abutment of the electro-optical component against the optical element, the solder pads will have complete contact, thus ensuring a satisfactory electrical connection.

The areas of the solder pads extending outside the corresponding pads on the electro-optical component can be provided with a buffer of solder material. This further ensures a satisfactory electrical connection.

The electro-optical component can be an electro-optical die arranged on a submount. The submount is then mounted onto the solder pads on the carrier substrate.

In this case, either the submount or the die (or both) can be brought into abutment with the optical element.

The size and form of the two likely differs and which to choose to bring into abutment with the optical element depends on the application. Typically, the submount is more robust, and therefore more suitable to use as an alignment abutment.

The optical element can be a collimator within a lighting device. The invention is thus suitable for use in e.g. a vehicle headlighting module.

The electro-optical component can be soldered using a reflow soldering process. Such a soldering process can be advantageous for creating self-alignment conditions.

Other embodiments of the present invention will appear from the following detailed disclosure, from the attached dependent claims as well as from the drawings.

BRIEF DESCRIPTION OF THE DRAWINGS

The invention will be more apparent from the accompanying drawings, which are provided by way of non-limiting examples.

DETAILED DESCRIPTION OF PREFERRED EMBODIMENTS OF THE INVENTION

Figure 1A:
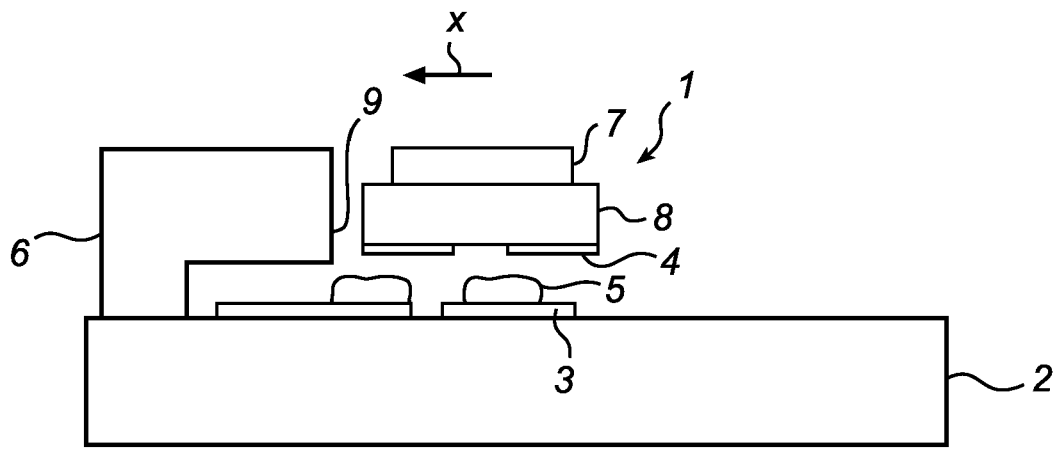
FIG. 1a is a schematic illustration of a mounting structure according to a first embodiment of the present invention, in a state before soldering.
Figure 1B:
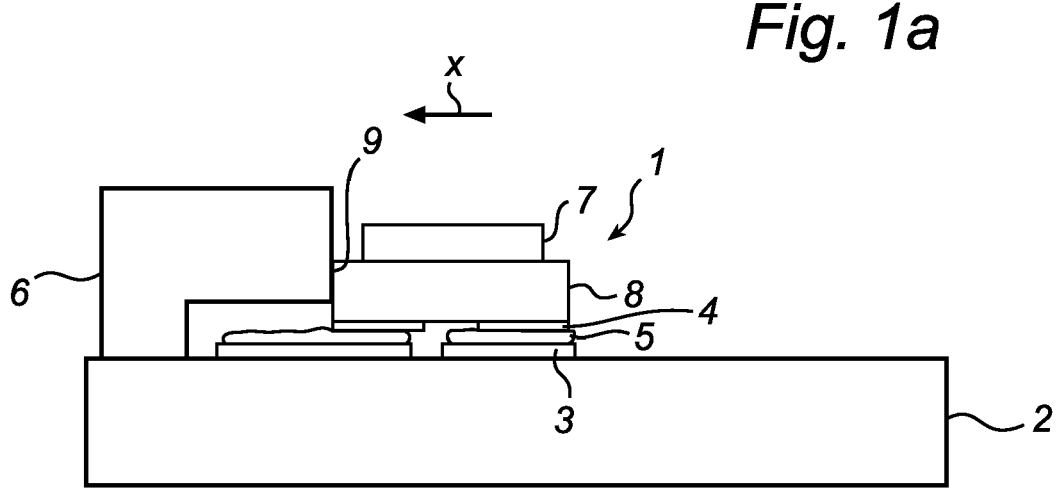
FIG. 1b is a schematic illustration of the mounting structure in FIG. 1a, in a state after soldering.
Figure 1C:
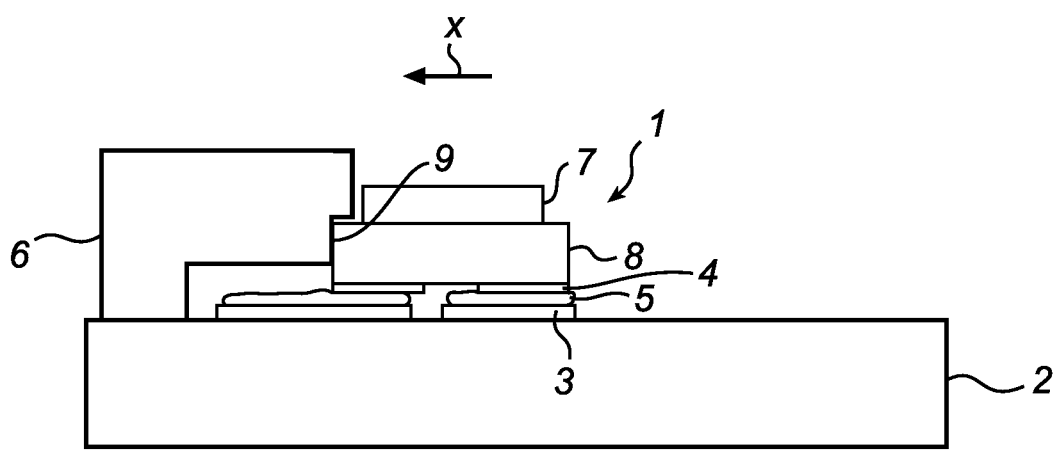
FIG. 1c is a schematic illustration of a variant of the mounting structure in FIG. 1a, in a state after soldering.

FIG. 1a-1c show a mounting structure, i.e. a collection of components, arranged for mounting an electro-optical component 1 accurately in relation to an optical element 6.

The electro-optical component 1 can be a LED or a photodiode, and typically is a "die-on-ceramics" (DoC) type component, i.e. a die mounted on a submount for subsequent mounting on a carrier substrate, such as a PCB. In FIG. 1a, the electro-optical component 1 comprises a LED die 7 on a submount 8. The electro-optical component can of course comprise more than one LED.

Reference number 2 denotes a carrier substrate, on which solder pads 3 also referred to as a "footprint", are arranged. This footprint can serve multiple purposes, for example, but not limited to electrical connection, mechanical connections and thermal connections, and any combination thereof. Corresponding solder pads 4 are provided on the DoC 1, and solder material 5 is placed in between said solder pads 3 and 4. The solder material can be solder paste, pre-applied solder (already present on the substrate), galvanic solder or solder in the form of so-called preform.

The optical element 6 can be any type of optics that needs to be aligned with the optical component, e.g. a collimator, diffusor or reflector. In the presently illustrated embodiment, the optical element 6 is arranged on the same substrate 2 as the electro-optical component is to be mounted on.

The DoC component 1 is here mounted onto the substrate 2 using a reflow soldering process. The solder pads 3, 4 on the substrate 2 and DoC 1 are further designed and arranged such that a self-alignment effect causing a side-way movement of the DoC 1 will occur during subsequent melting of the solder paste 5. In the illustrated example, the two pads 3 are arranged laterally displaced in relation to the two pads 4. The lateral displacement of the solder pads 3 does not necessarily need to be identical for each solder pad 3. On the contrary, and as illustrated in FIG. 1a, the displacement may vary individually. Other pad arrangements, including other number of pads on the substrate 2 and/or the DoC 1 are also possible, as long as the desired self-alignment effect is created during melting of the solder paste 5.

In the illustrated example, the solder pads 3 on the substrate 2 further have a greater lateral extension than corresponding pads 4 on the DoC component 1. Although not required to create the self-alignment effect, the greater extension of the pads 3 enable a lateral self-alignment while still providing a footprint that largely supports the pads 4 when the DoC 1 is first placed on the substrate. As a result, the pads 3 can ensure significant support of the solder pads 4 during the entire self-alignment process, thus securing a good electrical connection.

When placing the DoC component 1 onto the substrate 3, the solder pads 4 of the DoC component 1 need only to touch the solder paste 5. When the solder paste 5 is subsequently melted during soldering, due to the specific arrangement of the pads 3, 4, surface tension forces will pull the DoC component 1 in direction x towards the optical element 6. The pads 3, 4 are arranged in such a way that a part of the component 1, here the submount 8, is brought into abutment with the optical element 6 before the component 1 reaches a well defined end-position governed by the surface tensions laws.

In order to ensure that the DoC is brought into contact with the electrical element 6, the solder pads 3 preferably extend under a protrusion 9 of the optical element 6.

FIG. 1b shows the structure in FIG. 1a, after the soldering process has brought the submount 8 of the DoC component 1 into abutment with the optical element 6.

Alternatively, and as shown in FIG. 1c, the optical element 6 can be formed to allow the submount 8 to partly slide under a protrusion 9 of the optical element 6. This enables the LED die 7 to be brought closer to the optical element 6, which may be required in some applications.

In principle, it is possible to let the protrusion 9 be formed such that it is the die 7, and not the submount 8, that is brought into contact with the element 6. However, typically the submount 8 is the more robust part of the electro-optical component 1, and is better suited for making the abutment.

Figure 2:
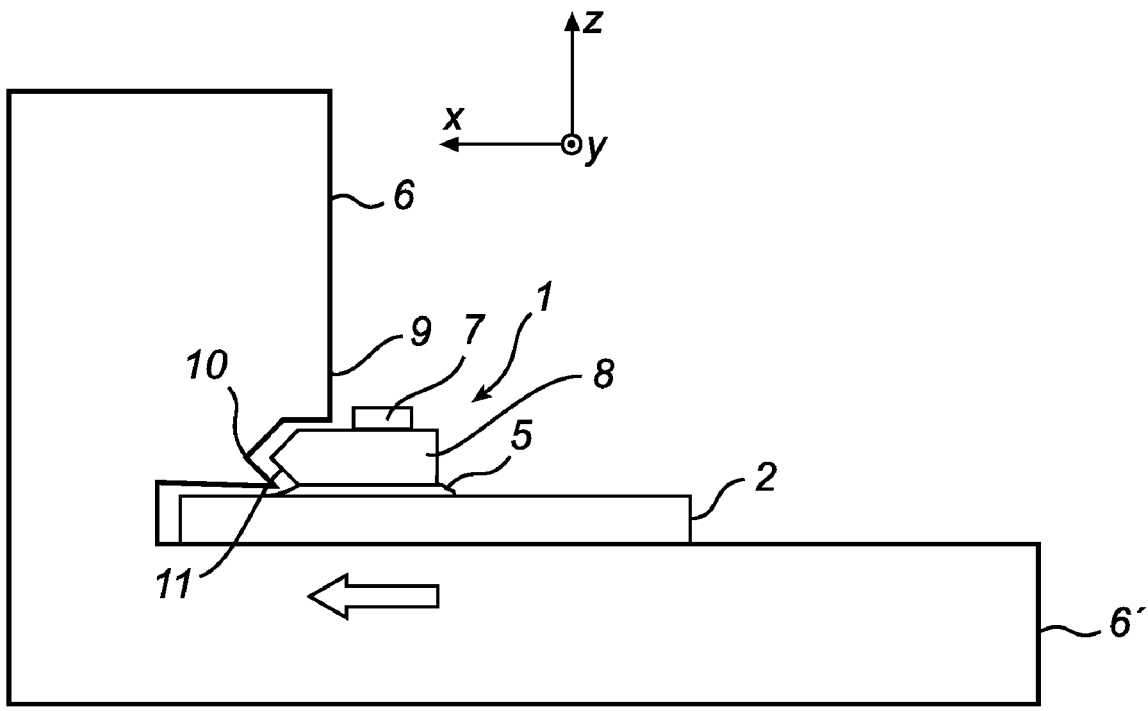
FIG. 2 is a schematic illustration of a second embodiment of the present invention.

In a second embodiment of the invention, the optical element 6 is formed by a portion of module 6' onto which the carrier substrate 2 is arranged, as shown in FIG. 2. In other words, instead of mounting the optical element 6 and the electro-optical component 1 on the same substrate 2, as shown in FIG. 1, the substrate 2 is arranged on a module 6' in itself forming the optical element. The substrate 2 can be mounted using conventional mounting techniques, including soldering, or adhesive, but may alternatively be mechanically fixated using suitable fixating means.

Further, in FIG. 2, the DoC component 1 and/or the optical element 6 are geometrically designed to ensure correct relative alignment. Such design can achieve an accurate alignment not only in the lateral direction x, but also in the other dimension y of the plane of the substrate 2. The design may even be able to achieve some alignment in the vertical direction z, but such alignment will be restricted by the adhesive forces of the solder paste 5.

The geometric design can for instance as illustrated in the example, be realized with a reference system in form of a V-groove 10 on the optical element 6 and a notch 11 on the electro-optical component 1. Now, when the component 1 is brought into contact with the element 6, the groove 10 will guide the tip of the notch and thus align the component 1 sideways (direction y) as well as laterally (direction x). Minor adjustments in the vertical direction z may also be possible.

Figure 3:
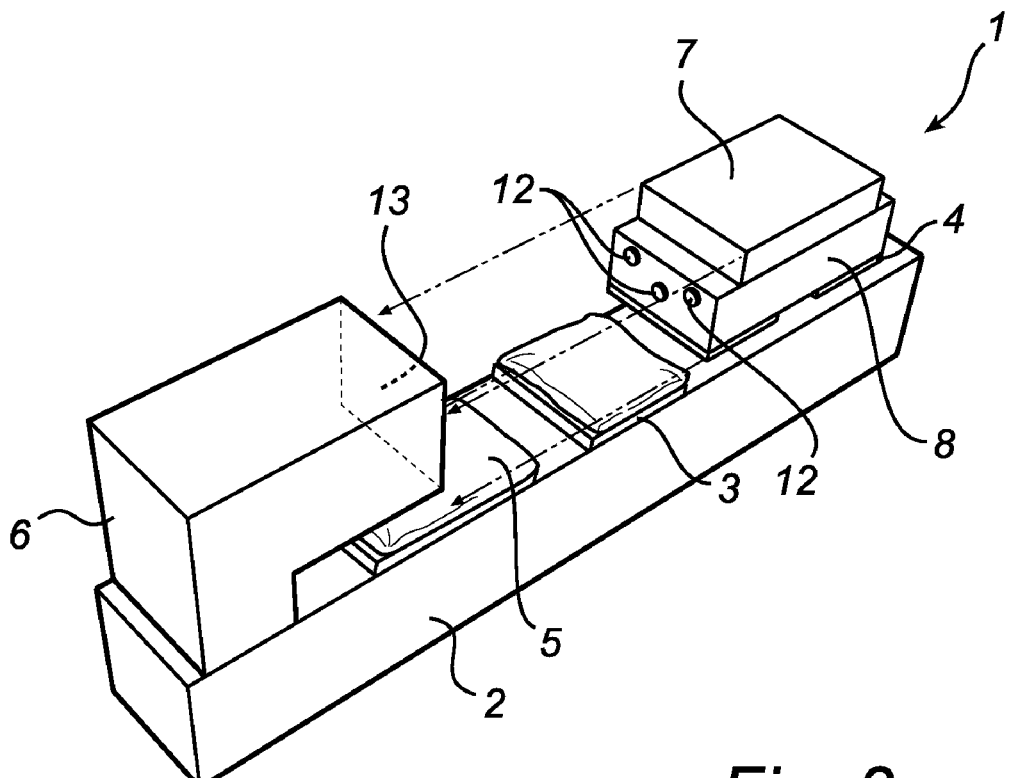
FIG. 3 is a perspective view of an embodiment of the present invention, wherein an optical element and an electro-optical component have defined contact points.

FIG. 3 illustrates a variant of the above described geometric design, wherein the electro-optical component 1 and the optical element 6 define three contact points 12, such that, when they are brought into abutment with each other, the contact points 12 ensure alignment in a predetermined plane. The contact points 12 are in the illustrated example realized with three abutments 12 on the surface of the submount 8, with the optical element 6 providing a planar surface 13 to touch the abutments 12. During soldering, the component 1 will be pressed against the element 6 until all three abutments 12 are in contact with the surface 13, thus accurately aligning the component in a predefined plane.

As an example of application of the invention, the module 10 in FIG. 2 can be the base part of a vehicle headlight system, on which a reflecting layer is attached to form an optical element, acting as part of a collimator. A LED lighting element to be used as a light source can be mounted as described above, thus achieving a very exact alignment with the edge of the reflecting surface.

Various modifications of the presently described embodiments are possible within the scope of the appended claims. For example, multiple electro-optical components can be assembled using the described self-alignment method, so that all these electro-optical components are aligned against an optical part. Further, the arrangement of optical element and electro-optical component may be different than that described above.

The invention claimed is:

1. A mounting structure comprising:
   an electro-optical component to be mounted in alignment with an optical element, and
   a carrier substrate, fixedly arranged with respect to said optical element, said carrier substrate and said electro-optical component each comprising at least one solder pad, wherein
   said electro-optical component comprises an electro-optical die arranged on a submount,
   said solder pads are arranged such that, when said electro-optical component is soldered onto the pads, a force is generated that acts on said electro-optical component in a direction (x) towards said optical element, and
   said structure is designed to allow said electro-optical component to move in said direction (x) during soldering, such that said submount is brought into abutment with said optical element.

2. The mounting structure according to claim 1, wherein said submount and/or said optical element has a geometric form adapted to align said electro-optical component when brought into abutment with said optical element.

3. The mounting structure according to claim 2, wherein said submount and said optical element define three contact points, such that, when said submount and said optical element they are brought into abutment with each other, the contact points facilitate alignment therebetween in a predetermined plane.

4. The mounting structure according to claim 2, wherein said electro-optical component and said optical element are formed with notch and groove features, adapted to fit into each other when they are brought into contact.

5. The mounting structure according to claim 2, wherein said optical element comprises a protrusion dimensioned and arranged so as to allow a portion of said electro-optical component to slide under said protrusion.

6. The mounting structure according to claim 1, wherein said at least one solder pad disposed on the carrier substrate is laterally displaced in relation to the corresponding at least one solder disposed on said electro-optical component.

7. The mounting structure according to claim 1, wherein said at least one solder pad arranged on said carrier substrate has a greater extension than the corresponding solder pad on said electro-optical component.

8. The mounting structure according to claim 5, wherein said at least one solder pad on the carrier substrate extends under the protrusion of the optical element.

9. A method for mounting an electro-optical component in alignment with an optical element, said electro-optical component comprising an electro-optical die arranged on a submount, said method comprising soldering said electro-optical component onto a carrier substrate being fixedly arranged in relation to said optical element, using solder pads provided on said electro-optical component and said carrier substrate respectively, wherein said solder pads are positioned in relation to each other such that, when said electro-optical component is soldered onto the substrate, a force is generated that acts on said electro-optical component in a direction (x) towards said optical element, and wherein said electro-optical component is movable in said direction (x) during soldering, such that it is brought into abutment with said optical element.

10. The method according to claim 9, wherein the positioning of said solder pads comprises laterally displacing the solder pads provided on said carrier substrate in relation to the corresponding pads provided on said electro-optical component.

11. The method according to claim 9, wherein said optical element comprises a protrusion, the method further comprising sliding said electro-optical component under said protrusion during soldering.

* * * * *